(12) United States Patent
Wilson et al.

(10) Patent No.: US 7,203,354 B2
(45) Date of Patent: Apr. 10, 2007

(54) KNOWLEDGE BASED COMPUTER AIDED DIAGNOSIS

(75) Inventors: Laurence Sydney Wilson, Allambie Heights (AU); Stephen Frank Brown, West Ryde (AU); Rongxin Li, Epping (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 573 days.

(21) Appl. No.: 10/149,163

(22) PCT Filed: Dec. 6, 2000

(86) PCT No.: PCT/AU00/01504

§ 371 (c)(1),
(2), (4) Date: Oct. 15, 2002

(87) PCT Pub. No.: WO01/43073

PCT Pub. Date: Jun. 14, 2001

(65) Prior Publication Data

US 2003/0076987 A1    Apr. 24, 2003

(30) Foreign Application Priority Data

Dec. 7, 1999    (AU) .................................. PQ4498

(51) Int. Cl.
*G06K 9/00*    (2006.01)

(52) U.S. Cl. .................................. 382/131; 382/173

(58) Field of Classification Search ........ 382/128–134, 382/164, 171, 173, 177, 179, 172; 600/36, 600/381, 410, 480, 482, 485, 490, 500, 505, 600/499; 604/22, 27, 28, 159; 606/159; 378/4, 15, 901
See application file for complete search history.

(56) References Cited

U.S. PATENT DOCUMENTS 4,459,990 A * 7/1984 Barnea ...................... 600/433

(Continued)

FOREIGN PATENT DOCUMENTS

EP    822515    2/1998

(Continued)

OTHER PUBLICATIONS

Shekhar R. et al.: "Three-dimensional segmentation of luminal and adventitial borders in serial intravascular ultrasound images." Computerized Medical Imaging and Graphics, Nov.-Dec. 1999, Elsevier, UK, vol. 23, No. 6, pp. 299-309.

(Continued)

*Primary Examiner*—Jingge Wu
*Assistant Examiner*—Abolfazl Tabatabai
(74) *Attorney, Agent, or Firm*—Merchant & Gould P.C.

(57) ABSTRACT

A method of extracting computer graphical objects including at least one vessel structure from a data volume of a portion of an anatomy, the method comprising the steps of: utilizing knowledge based image processing to locate centerlines and utilizing an active surface technique to extract the outer surface of said vessel structure; and storing co-ordinate information of said outer surface for subsequent display.

18 Claims, 6 Drawing Sheets

U.S. PATENT DOCUMENTS

| | | | |
|---|---|---|---|
| 5,031,620 A * | 7/1991 | Oe | 600/425 |
| 5,125,410 A * | 6/1992 | Misono et al. | 600/463 |
| 5,345,938 A * | 9/1994 | Nishiki et al. | 600/463 |
| 5,419,774 A * | 5/1995 | Willard et al. | 604/22 |
| 5,644,646 A * | 7/1997 | Du et al. | 382/128 |
| 5,812,691 A * | 9/1998 | Udupa et al. | 382/128 |
| 5,881,122 A * | 3/1999 | Crawford et al. | 378/4 |
| 6,561,996 B1 * | 5/2003 | Gorsuch | 604/6.09 |

FOREIGN PATENT DOCUMENTS

| | | |
|---|---|---|
| WO | 97/24697 | 7/1997 |
| WO | 00/08600 | 2/2000 |

OTHER PUBLICATIONS

Brown M S et al.: "An extensible knowledge-based architecture for segmenting computed tomography images." Image Processing, 1997. Prodeedings, International Conference on Santa Barbara CA., Oct. 26, 1997 pp. 516-519.

Minsky M; "A Framework for Representing Knowledge." Psychology of Computer Vision, McGraw-Hill Book Co., London, GB. 1975, pp. 211-277.

Brinkley J F: "A distributed, object-oriented framework for medical image management and analysis: application to evaluation of medical image segmentation techniques." Biomedical Image Analysis, 1994., Proceedings of the IEEE Workshop on Seattle WA. Jun. 24, 1994, pp. 194-203.

Thompson, et al., "A Surface-Based Technique for Warping Three-dimensional Images of the Brain", IEEE Transactions on Medical Imaging, vol. 15, No. 4, Aug. 1999, section III, X.

Shekhar, et al., "Three-dimensional segmentation of luminal and adventitial borders in serial intravascular ultrasound images", Computerized Medical Imaging and Graphics 23, 1999, pp. 299-309.

Klingensmith, et al., "Evaluation of Three-dimensional Segmentation Algorithms for the Identification of Luminal and Medial-Adventitial Borders in Intravascular Ultrasound Images", IEEE Transactions on Medical Imaging, vol. 19, No. 10, Oct. 2000, Introduction.

* cited by examiner

KNOWLEDGE BASED COMPUTER AIDED DIAGNOSIS

FIELD OF THE INVENTION

The present invention relates to the automated extraction of structures from a series of inter-related images of the structures. In particular, the present invention discloses a method and apparatus for extraction of three dimensional computer objects of medical organs from multiple two-dimensional slices such as CAT scans or the like.

BACKGROUND OF THE INVENTION

In the process of surgical planning, the specialist often is provided with a series of X-ray film, CT scans or NMR scans of the human body. These scans are often of a two dimensional nature and the human expert must imagine or extrapolate, in any surgery planning techniques, to the corresponding three dimensional structure of the body or organ of which they are to operate.

Further, the same or similar diagnosis techniques from 3-D imaging must be used in other fields such as radiotherapy planning etc.

The utilization of two-dimensional structures and the attempted extrapolation to three dimensions can provide for erroneous results.

SUMMARY OF THE INVENTION

It is an object of the present invention to provide for an improved method and apparatus for the extraction of three-dimensional structures from two-dimensional CT scans or the like.

In accordance with a first aspect of the present invention there is provided a method of extracting computer graphical objects including at least one vessel structure from a data volume of a portion of an anatomy, the method comprising the steps of:

utilising a segmentation process to determine an approximate axial location of said vessel structure;

utilising an active surface technique to extract the outer surface of said vessel structure based on said approximate axial position as a seed for the active surface technique; and storing co-ordinate information of said outer surface for subsequent display.

Advantageously, the segmentation process further includes the step of processing the said data volume to produce an intermediate data structure and utilising an inferencing system on the intermediate data structure to determine the most suitable candidate for said at least one vessel structure.

Preferably, the inferencing process system is arranged in manner such that the most suitable candidate is identified based on model object frames, the model object frames each including a set of data entries specifying information about a model object. The information may include unary properties of the model object and/or relationship properties of the model object. The relationship properties may include one or more of the group of a membership property of a semantic network, and relative location data with respect to other model objects.

Preferably, the inferencing system is arranged in a manner such that it bases its determination on the laws of fuzzy logic.

In a preferred embodiment the step of determining the outer surface of said vessel includes utilising marked points through which the resultant surface must go in the active surface technique.

In another preferred embodiment the active surface technique is based on data provided by a user from an initial analysis of the data volume. The data provided may include one or more of the group of at least two points located inside said at least one vessel structure, and at least two manually traced perpendicular vessel outlines.

The at least one vessel structure may include a thrombus.

The at least one vessel structure may comprise one of a blood vessel, an airway, and other passageways of a human's anatomy. The at least one vessel structure may comprise one of the aorta, the superior mesenteric artery, a renal artery or an iliac artery.

Preferably, said data volume comprises a series of two-dimensional computer tomography scanned images of a human's anatomy.

In one embodiment said segmentation process utilises a series of sampled images at different sampling resolutions for identification of different vessel structures.

Advantageously, said segmentation process includes applying a 3-dimensional line enhancement filter to said data volume.

Preferably said segmentation process includes skeltonisation of a line enhanced filtering of an initial data volume.

In one embodiment said active surface technique includes an adaptive thresholding processes.

In accordance with another aspect of the present invention there is provided an apparatus for extracting computer graphical objects including at least one vessel structure from a data volume of a portion of an anatomy, the apparatus comprising:

segmentation processing means for applying a segmentation process to determine an approximate axial location of said vessel structure;

active surface processing means for applying an active surface technique to extract the outer surface of said vessel structure based on said approximate axial position as a seed for the active surface technique; and a database for storing co-ordinate information of said outer surface for subsequent display.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 6 illustrates a vessel having a number of planes there through;

DETAILED DESCRIPTION OF THE EMBODIMENTS

Figure 1:
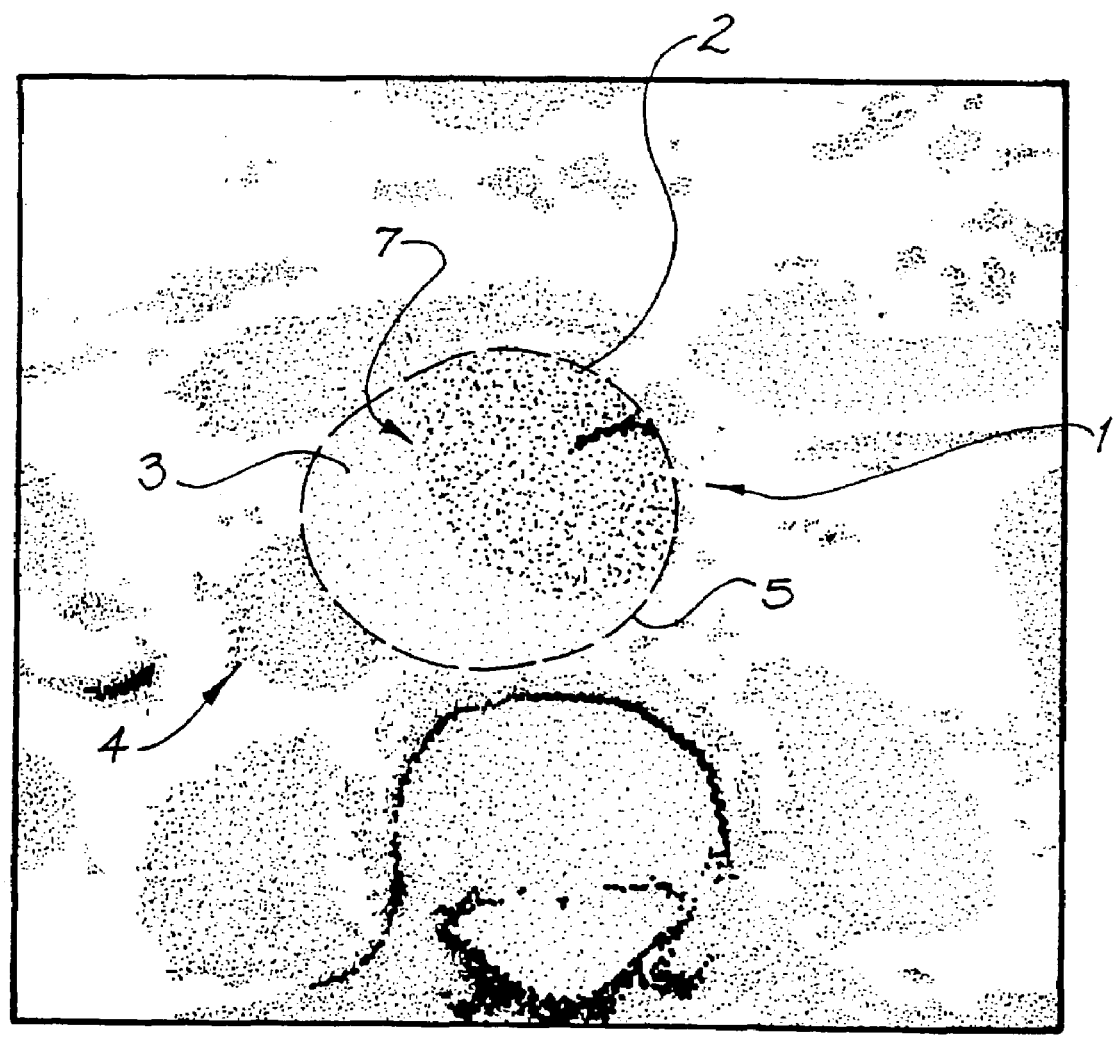
FIG. 1 illustrates a Computer Aided Tomography scan of a portion of the aorta including a thrombus after image processing to enhance identifiable structures.

In the preferred embodiment, a system is presented for extracting bodily organs from input data such as three-dimensional X-ray computed tomography (CT) images. The extraction of bodily pails in the preferred embodiment include the abdominal aorta and major arteries connected to it.

In the preferred embodiment, the input data is processed utilising three dimensional image processing in addition to knowledge based methods to locate various vessels. Initially, the axis of the major vessels are located. This is followed by a scheme for extraction of the structure such as the aorta as a whole. The preferred embodiment is particularly directed to the extraction of the aorta where the contrast medium may not extend to the vessel wall due, for example, to the presence of a thrombus. The preferred embodiment is particularly useful in the surgical planning for the treatment of aneurisms. In an aneurism, the main flow channel is partially surrounded by thrombus (clotted blood). For example, in FIG. 1, there is illustrated an image enhanced CT scan cross section of an aorta 1 which includes a flow channel 2 around which is partially surrounded a thrombus 3 of clotted blood. Whilst the image of FIG. 1 has been imaged processed to enhance detail, the flow channel 2 is normally represented by much higher CT numbers than the thrombus 3 due to the injection of a contrast medium into the blood. The thrombus 3, on the other hand, has intensity levels similar to those of surrounding nearby vessels and organs eg. 4 which poses a serious challenge to the extraction of the aorta from nearby vessels and organs. It is necessary to locate the wall 5 of the aorta which is a combination of the boundaries of the flow channel 2 and the thrombus 3.

In the preferred embodiment, substantial improvements were evidenced as a result of the incorporation into the segmentation process, of knowledge-based methods and a symbolic representation of the properties of and relationships among structures to be located in CT medical images. In the knowledge-based system of the preferred embodiment, the "knowledge" has an explicit and separate representation from the pixel-level image analysis procedures.

The preferred embodiment provides a 3-D application system for segmenting, visualising and measuring abdominal aortic aneurisms (AAA) from three-dimensional CT, as an aid to pre-treatment planning. Such planning is particularly important for minimally-invasive endovascular deployment of stent grafts. However, the separation of knowledge and image analysis inherent in this method allows the same software to be applied to segmenting almost any tree-like structure, such as any contrast-enhanced vasculature or the bronchial tree, with only minor changes to the model and image processing.

The system for knowledge-based image analysis depends on a representation of anatomy which is explicit in the sense of being separate from and independent of, the image analysis algorithms. Furthermore, it needs to incorporate anatomical variability and abnormalities, including the possibility of missing structures. This is achieved through the use of frames for knowledge representation and fuzzy logic for expressing variability in binary (relational) and unary (intrinsic) properties of image structures. The image analysis is model-driven, and uses binary dependencies among model structures to determine the order of segmentation, identifying "candidates" for structures in the model. The best candidate for each structure is defined in terms of its membership value of the appropriate fuzzy sets defined for that structure.

The problems recovering the wall of the aorta is ill-posed in that the wall is often under determined on a given CT slice or consecutive slices due to the presence of connecting and otherwise adjacent vessels eg. 4. These vessels can appear to be part of the aorta in the image. Further, other structures in the image are somewhat irrelevant. In the preferred embodiment, the wall 5 of the aorta is recovered utilizing an "active surface" algorithm. The active surface algorithm is related to research in the active contour area. Active contours algorithms are described in the text "Active Contours" by Andrew Blake and Michael Isard published by Springer-Verlag London Limited, 1998. An active surface is a model that evolves in a three dimensional image under forces that impose regularity of the surface and attract the surface towards desirable features in the image such as grey level discontinuities.

1 General Methodology

Figure 2:
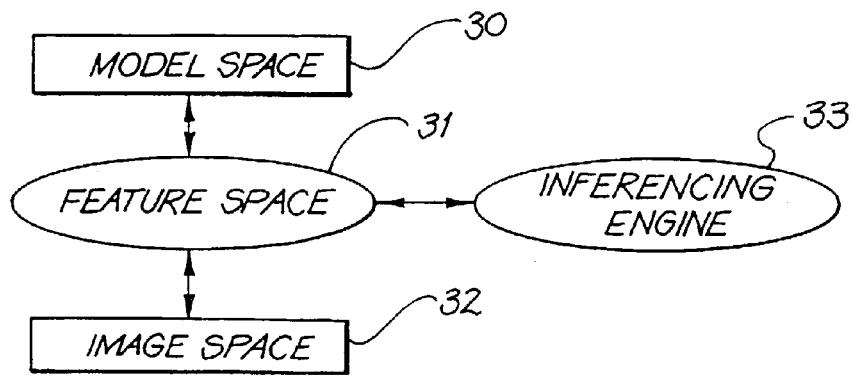
FIG. 2 illustrates a schematic of an inferencing engine of the preferred embodiment.

Turning to FIG. 2, the aim of image segmentation is to create a mapping between an image space 32 and a set of labels corresponding to the anatomical entities of which it is desired to identify in the image. The information linked to these labels comprises the model 30. The preferred embodiment proceeds by a model driven approach. While the model drives the segmentation, it is expressed separately from the image processing algorithms which operate in image space 32. Each of the four components of the system shown in FIG. 2 will now be described individually:

1.1 Model Space (or Knowledge Base) 30

The model consists of information about the structures to be identified in the image, and will, in general, contain a mixture of modality-dependent and modality-independent information. In the preferred embodiment, anatomical knowledge is stored in a declarative (rather than procedural) model in which rules for locating structures are not specified, but implied by the inferencing engine 33 from the information comprising the model. All objects in the model have anatomical significance, and are organs or parts or groups of organs.

Each entity in the knowledge base is represented by a frame, which is a well known device introduced by Minsky for knowledge representation in Artificial Intelligence. Each frame incorporates a number of slots, which contain information about the structure in the model. Most frames refer to structures which are to be located in the image by specified image processing procedures, though it is also possible to include generic frames, whose sole purpose is to provide properties inherited by other frames. Other frames may represent "part of" relationships, and these implicitly inherit properties from the entities of which they are a part.

Properties of frames may be both unary and binary, where unary refers to properties relating only to the individual object, while binary properties refer to relationships among structures. The set of binary relationships among frames constitute a semantic network among them. In general, organs will be related through a number of semantic networks, each binary property generating its own network. Many properties may be expressed in terms of numerical parameters (e.g. expected grey level, size, position relative to another organ etc), but because of anatomical variability, these must be expressed via membership of fuzzy sets. The membership value is an important parameter in estimating the confidence of identification of that structure in the image.

Figure 3:
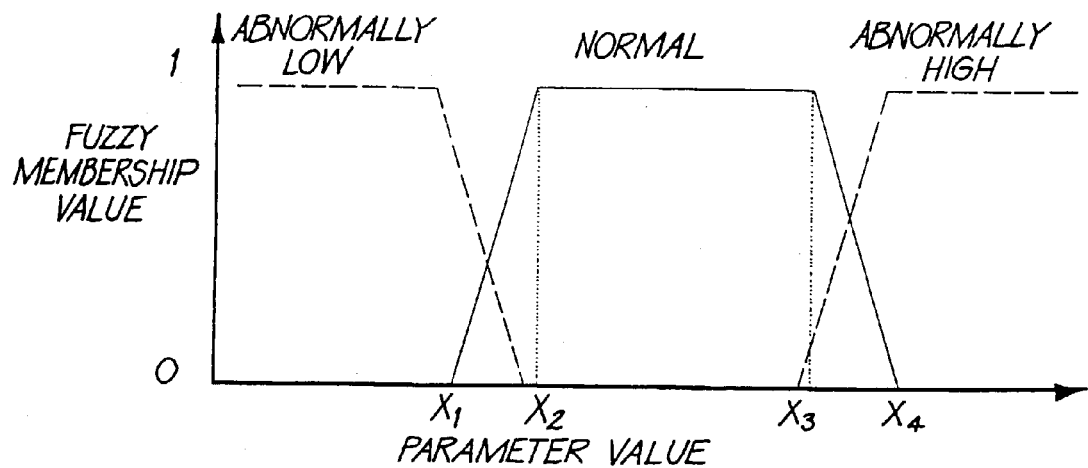
FIG. 3 illustrates a graph of the fuzzy set operations of the preferred embodiment.

A typical fuzzy membership plot is shown in FIG. 3 which provides an example of the unary properties of the numerical property x associated with a particular frame F. The "normal" range is expressed as $x_2$ to $x_3$, hence an instantiation F has membership 1 of the normal set if $x_2<X<x_3$, with $x_1$ and $X_4$ as extreme values for x. Known abnormalities of F associated with ranges of x may have associated fuzzy membership curves. Similar fuzzy membership curves may be generated for relationships among organs, e.g. the relationship "to the left of" may be quantified in precise units of length. The values of $x_1$, $x_2$, $x_3$ and $x_4$ can be determined from a combination of information from textbooks, discussions with clinicians and interactive adjustment using a series of images.

In order that a clinically feasible abnormality does not produce a low confidence level, and preclude recognition, some properties can allow "abnormally high" or "abnormally low" ranges. Membership of either of these sets does not alter the confidence of identification, but can flag the parameter value as an abnormality.

Most frames will be associated with image analysis procedures which produce candidates for the named entity. These procedures are rules for labelling connected subsets of image pixels as candidates. Frames without image processing will include generic frames (parent frames of "is a" relationships), or parent frames of "part of" relationships.

In the preferred embodiment, the knowledge base or model space 30 (FIG. 2) defines the application, so the model is exhaustive with respect to that application, but not necessarily to other applications using the same image data set. Inferencing can proceed without detailed knowledge of the form of the candidates and constraints, allowing the inferencing to be expressed generically.

The model consists of a definition of vessel segments, including such unary features as the diameter, direction (defined for proximal to distal direction of travel) and binary features associated with topological connectivity to other vessels. Each such anatomical structure is represented by a frame in the model definition, where a frame is a software object containing the properties of that object in slots. These slots contain not only the expected numerical values of properties, but also the allowable ranges for the unary and binary properties of that structure. These ranges map into fuzzy membership values for candidates for the anatomical structure. The image processing for locating the structure is also determined by the information stored in each frame's slots.

A specific example of the use of the framed system will now be described with specific reference to an abdominal aortic aneurism.

Figure 4:
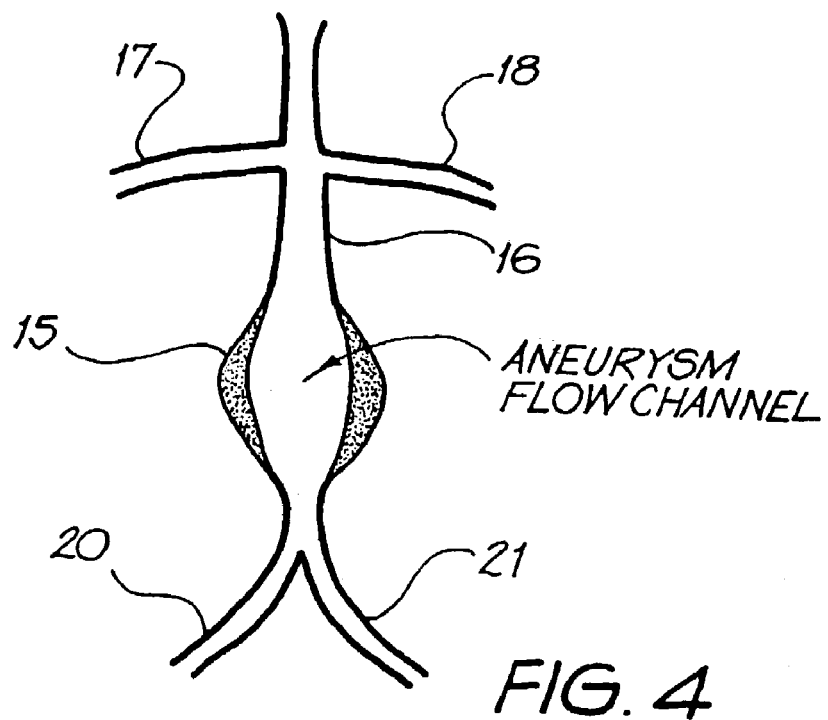
FIG. 4 illustrates schematically the structure of the human aortic anatomy.
Figure 5:
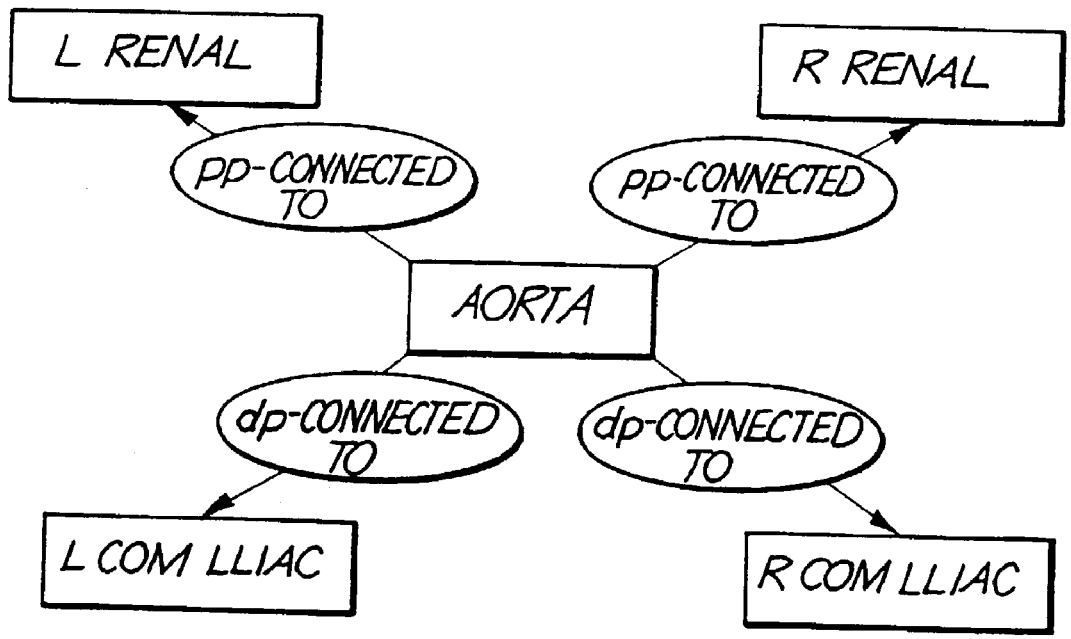
FIG. 5 illustrates a corresponding schematic form of human aortic anatomy.

The anatomy of an abdominal aortic aneurism is shown in schematically in FIG. 4 and is based around a presumed thrombus formed around the aorta 16. It is desired to extract the aorta structure (including thrombus 15) and the renal 17, 18 and iliac 20, 21 arteries.

In FIG. 4 there is illustrated the equivalent symbolic anatomical model 25, with binary relationships e.g. 26 relating to the connectivity. The term "dp-connected" refers to the distal extremity of one vessel being connected to the proximal part of another, with similar meanings of pp-, dd- and pd-connectivity.

1.2 Image Processing Modules (Image Space) 32

Essential to the knowledge-based approach is reliance on high-level reasoning to segment images, rather than pixel-level processing to identify specific anatomical structures. Hence the image analysis procedures defined in the model frames may be described as having extremely high sensitivity, but very low specificity. Their aim is to produce the "tokens" or "primitives" which become candidates for the inferencing stage. In some cases the procedure locates parts of a structure (e.g. an edge, or fundus etc) and the entire structure is located by means of its dependencies on the locations of its constituent parts. There is no restriction on different frames locating the same candidates. For example, for locating blood vessels it may be necessary for the image processing to find every vessel in the image as a candidate for every vessel in the model, relying on the inferencing to label specific branches of the vascular tree.

A significant problem for the image processing is to avoid over-segmentation or under-segmentation, though some strategies may allow for these. The inferencing engine relies on the assumption that the "best" candidate for a model structure corresponds precisely to that structure, and is not larger or smaller. Over-segmentation results in candidates for subsets of entities described in the frames. This can be compensated by generating extra candidates consisting of all possible combinations of two or more candidates located by the image processing. The combinatorial multiplicity of such groupings may be reduced by linking candidates which are adjacent, or share common unary properties. Under-segmentation results in candidates which correspond to combinations of anatomical objects. The best way to allow for this may be to anticipate and generate such supersets in the model, and use "part of" relationships to describe the relationships between the smaller and larger objects.

1.3 Inferencing Engine (33)

The role of the inferencing engine is to create a set of correspondences between model objects (i.e. organ labels) and candidates (tokens) by choosing the "best" candidate for each object in the model. Note that some knowledge-based systems embody "rules" in the knowledge base, where a rule is an application-specific sequence of algorithmic steps for segmenting all structures in the model. A disadvantage of such systems is the fact that adding new knowledge to the system may result in the rules needing to be completely re-defined for that application. However, in the preferred embodiment the system effectively generates its own rules based on the information in the frames, distinguishing it from rule-based systems. Most significantly, the self generation model permits the same inferencing engine to solve several entirely different problems.

The number of binary relationships in even a relatively simple model such as those described below can be large. In principle, every permutation of matched primitives to frames could be tested in an exhaustive search for a global maximum of the overall confidence score, but at the expense of a high computing cost. An alternative strategy might be to perform a completely ordered search, in which each anatomical structure is identified in turn. However, the disadvantage of this strategy is that an ordered search does not reflect the number of mutual dependencies usually present, and which are used by the clinician who does not normally identify one structure at a time. Furthermore, incorrect identification could lead to "dead ends", requiring backtracking, which may result in failure of the identification process to converge.

A compromise between these two strategies has been adopted in the preferred embodiment. The relationships between frames in the semantic network usually suggest natural groupings among them. These groupings represent sets of structures which should logically be identified simultaneously. Within each group, there is a complex set of interrelationships so a global optimisation of confidence in matching primitives to frames is evaluated for all frames within the group, then the next group evaluated, and so on. Confidences are calculated directly from the fuzzy membership values appropriate for the candidates and model structures under consideration. Using the laws of fuzzy logic, the confidence associated with assigning an image primitive $X_i$ to a class C is given by $$P(X_i \mid C) = \min_{j=1}^{T} P(x_{i,j} \mid C)$$

where the set of T features associated with $X_i$ is $x_{i1}$, $x_{i2}$, ... $x_{iT}$.

The search strategy can be controlled by the model. Groups are formed on the basis of the large number of mutual dependencies between frames, and the ordering between groups depends on the type of one-way dependencies between frames in different groups This approach allows several matching possibilities within a group of frames to be considered simultaneously.

Advantages of using the inferencing system described include:

flexibility to change the order of segmentation very easily (particularly since the knowledge specification is not compiled into the program)

localising the changes required when a different low level image processing technique is trialed searching for several objects simultaneously to add robustness when the probability of correctly locating each of the objects individually is low.

In summary, the segmentation proceeds by first determining from the binary properties associated with each anatomical structure, the optimal order for segmenting structures. Objects on which the segmentation of others depends are located first, and natural groupings for simultaneous segmentation are also found. For each model structure, the processing locates a number of candidates, where each candidate is represented by a token, which, in the case of vessel segments consists of a list of voxels lying along its medial axis. The "best" candidate for each model structure is then found by maximising a likelihood function based on a fuzzy membership value computed from the allowable ranges of unary and binary properties.

In the case of identification of the aorta and associated thrombus, the system in a current embodiment has nine frames to process. These frames represent the aorta, left and right iliacs at reduced and full resolution and the superior mesenteric artery (SMA) and left and right renal arteries at full resolution. These frames are formed into four groups. The first group is the three reduced resolution frames. The second group is the corresponding three full resolution frames. The third group is the superior mesenteric artery frame. The fourth group is the renal arteries.

1.4 Feature Space (31)

The entity "feature space" 31 is a consequence of the fact that anatomical space and pixel space are essentially incommensurate, and need to communicate via common entities. In this case, the common features are in the intersection of the two domains, i.e. tokens or primitives which comprise groups of pixels or voxels which also correspond to anatomical entities. In a practical sense, feature space comprises the "blackboard", in which a set of mutually-dependent model frames are duplicated as "blackboard frames", and the inferencing engine determines the best association of a candidate with each blackboard frame.

The preferred embodiment first determines from the model frames an optimal set of groupings for simultaneously-segmented structures, and the order in which the groups will be segmented. For some applications, this is imposed directly, so that some large-scale landmarking may be carried out as a pre-processing stage. Some image pre-processing (such as thresholding) may also be carried out globally, and the set of images with various types of pre-processing forming a "stack" of entries in the image space.

The candidate extraction process proceeds as follows:

Candidate extraction is carried out using image processing algorithms specified in the model. For structures whose location is specified with respect to an already-determined structure, this may restrict the spatial extent of the search. This processing may represent candidates in a subspace of lower dimensionality than the original, such as representation of vessels by their medial axes.

Extra candidates may be created by grouping of candidate primitives, to account for over-segmentation in the previous step.

The properties of each candidate (length, location etc) corresponding to the model properties are then determined for each candidate. This includes unary properties relating to other structures.

The best candidate for each structure in the current model subset is then identified. This is done by maximising a confidence score, based on the goodness of fit between the model properties and the each candidate's properties, including unary properties and binary properties pertaining to other members of the subset, or previously identified structures. In some instances (e.g. tumours), the number of successful candidates may be variable, including zero, while in others only the best candidate exceeding some threshold is selected. If the confidence threshold is not selected, the structure is denoted as "unfound".

This process is repeated for each group until all structures have been identified or designated as unfound (in rare circumstances the process may terminate unsuccessfully if too many structures are unfound).

The feature-space representation of a candidate structure will not, in general, be sufficient for a complete mapping of that structure back onto the image space after it has been identified, since the original data will normally have been subject to processing to reduce the total feature-space storage. For example vessels in three dimensions might be represented in feature space as a medial axis and distance function, while other features may be represented as local maxima of spatial filters. It is therefore necessary to locate the pixels (or voxels) in the original image which correspond to the feature. It might also be desirable to map other aspects of the anatomical structure onto the image; an example being the direction of flow in an artery. As described hereinafter, active contours are particularly suitable for this process since they have well-defined seed points and knowledge of the structure's shape may be built into the active contour model. Various embodiments may utilise two- or three-dimensional active curves for locating structures in images. In the case of three-dimensional images, the active surfaces themselves are the most suitable means of displaying the segmented image.

The preferred embodiment was particularly directed to extraction of major abdominal arteries in a vascular segmentation process. The intended use of the vascular segmentation is to permit vascular surgeons to appreciate and manipulate the thee-dimensional anatomy of the abdominal vasculature via a computer model, and to facilitate a number of measurements. These measurements are necessary for planning of minimal-access surgical procedures and for appropriate selection of prosthetic devices.

Images of the aorta and branches were obtained by contrast-enhanced helical CT scanning. The use of contrast medium allows a simple thresholding operation to separate the arterial network and bone from soft tissue. The inferencing system is used to distinguish contrast-enhanced arteries from bony structures, and to identify (label) arterial segments of interest, notably the aorta (including the segment subject to aneurism), iliac arteries and renal arteries.

Abdominal aortic aneurisms are caused by a weakening of the arterial wall, resulting in dilatation and, possibly, eventual rupture of the vessel. Treatment is commonly by minimal-access insertion of stent graft, for which accurate measurements of the extent and diameter of the aneurism are highly desired. After formation of the aneurism, a thrombus forms in the outer parts of the dilated segment, preventing contrast medium from entering these regions.

Because of the essentially linear nature of the vascular system, the form of the candidates chosen for the inferencing system was the central axis of the vessels. These were generated from the thresholded volume by a skeletonising operation, consisting of successive erosions of the voxels. The basic candidate segments were formed by breaking the skeletonised volume at each branch point. Small vessels branching from the aorta, as well as imperfections in the skeletonisation algorithm, can lead to the aorta being broken into multiple candidates. Various skeletonisation algorithms can be utilised and can be as provided for in the standard text books. For example, as discussed in "Digital Image Processing" by Gonzalez and Woods 1993, Addison Wesley Publishing Company, at page 491–494. To cope with these possibilities, the segmentation routine also combines up to 5 connecting basic segments into candidates. Alternatively, the skeletonisation process can consist of a combination erosion filter and a line enhancement filter such as that referred to hereinafter due to Sato et al.

The unary constraints used in this problem are the length, orientation and radius of the candidate segments. The length and orientation are calculated directly from the skeleton locations. The radius can be calculated as part of the skeletonisation processing. The only binary constraint used is connectivity between the end points of the aorta, iliacs and renal arteries, with clear distinction between connections at proximal and at distal ends of vessel segments (assuming that the vasculature is isomorphic to a directed acyclic graph, which is true for the vessels in this model). Dealing with lists of skeleton voxels significantly reduces processing time compared with using complete vessel segments as the segmentation primitives.

Each candidate consists of a directed list of voxel coordinates, the first element in the list identifying the proximal end of the segment, the last element in the list designating the distal end of the segment. In other words, the direction of blood flow is from the first element to the last element. However, the order in which the voxels are listed is arbitrary at this stage. In order to identify this segment with a model structure, a second candidate is generated with the order of elements reversed. Normally, only one of these candidates will satisfy the model criteria of appropriate connectivities and flow direction.

After identifying the skeleton segments with structures in the model, these segments are used to seed active surfaces to locate vessel boundaries. Region growing using sets of connected pixels may also be used for this purpose, but requires extra constraints when vessels are in contact with bone, since the vessel's voxels may leak into the bone volume. The use of an active surface is essential when locating the outer surface of the thrombosed region, since the Hounsfield number for thrombus is similar to that of surrounding soft tissue or blood, and region growing would always leak into surrounding tissue. Active surfaces are particularly suitable for the outer surface of an aortic aneurism since the high internal pressure naturally produces a low curvature surface.

Figure 7:
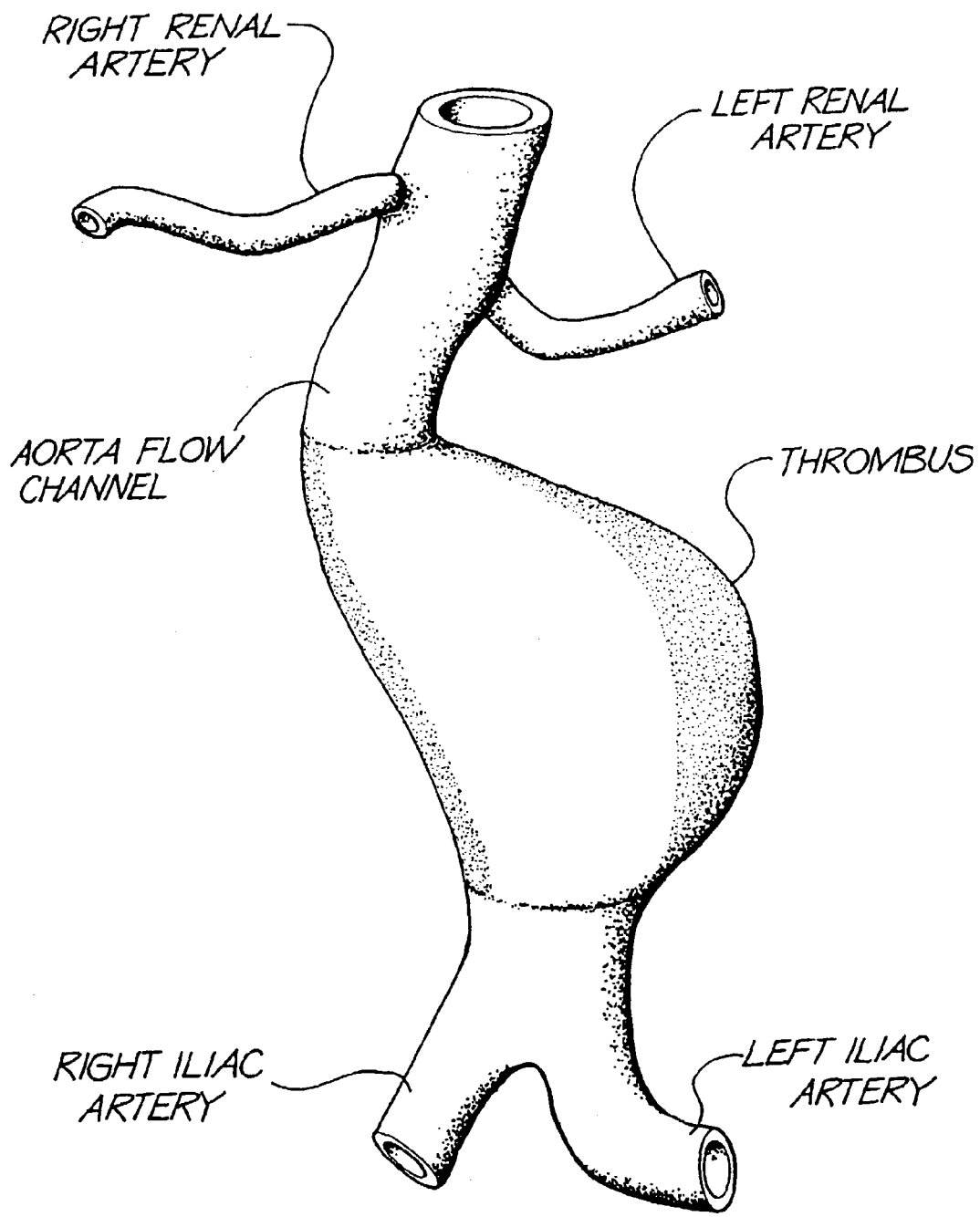
FIG. 7 illustrates various 3 dimensional computer graphical views of the resulting extraction process.

FIG. 7 shows various three-dimensional visualisations of an aorta showing the dilation of both the flow channel and the surrounding thrombus. Also identified automatically by the system are the left and right renal arteries, left and right iliac arteries and superior mesenteric artery.

1.5 Image Processing

After thresholding at 190 Hounsfield units, medial axes are calculated throughout the volume by skeletonisation, and, after some "pruning" of short, spurious branches, the resulting network is disconnected into simple, unbranching segments, each of which acts as a candidate for a structure in the model. In order to optimise the processing for vessels of different sizes, this is carried out at multiple different resolutions for the image. For the simple branching structures found in the abdominal vasculature, this model takes the form of a directed acyclic graph. Additional candidates are generated by combining simple segments to take account of over-segmentation and a multi-resolution approach which reduces computation time. Among the most useful binary properties for segmentation has been topological connectivity, while among the unary properties, vessel direction (including distinction between proximal and distal extremities) is used extensively.

1.6 Determining Vessel Locations (a) Reduced Resolution Processing

The same image processing is used to look for candidates for all three reduced resolution frames. The reduced resolution processing works with data that has been down-sampled to give (approximately) 3 mm voxels. After down-sampling, the data is mapped to voxel values in the range −120 to 190 HU with values outside this range being mapped to the respective low or high value. This rescaling prevents subsequent line enhancement filters, which are linear, from being overly effected by extremes in the data values.

The data is then filtered with a 3D line enhancement filter. A suitable filter is the algorithm of Sato et al (*Medical Image Analysis*, 2, 143–168, 1998) which analyses the eigenvalues of the Hessian matrix at each voxel. The line enhancement is preferably performed at 5 different spatial scales from 6.0 mm to 30.4 mm diameter. The large upper diameter is required to ensure that the aneurism swelling of the flow channel is still identified as a linear feature. The scaling is achieved by convolving the input image with the appropriate Gaussian smoothing kernel. Taking the maximum enhanced value across the five scales at each voxel forms the final enhanced image.

The final enhanced image is then thresholded, median filtered then closed to eliminate any small breaks along the vessels. This final image is then skeletonised and converted to a skeleton graph. The last stage before the candidates are generated is to remove any closed loops from the graph and add connections to the top surface where the graph approaches the surface but does not touch it.

(b) High Resolution Processing

The first stage of high resolution processing is to threshold the data at the 160 HU level. The thresholded data is then median filtered, closed then opened. The final stage is to fill any cavities in the processed data.

After skeletonisation, the skeleton graph is augmented by adding links to the top surface of the data cube whenever a sharp corner is detected in a graph segment that is within a given distance of the top surface.

The image processing is repeated individually for the aorta and two iliacs. The bounds of the processing region are determined from the location of the selected reduced resolution candidate. The aorta candidates are reused for superior resentric artery detection.

Having identified the medial axes corresponding to each model structure, the entire vessel is reconstructed by expansion into the grey scale or thresholded data using the medial axis as a seed. Both simple region growing and three-dimensional active contours have been developed for this part of the processing, and combining the two methods appears to be the most useful. A difficulty with segmenting cases is the thrombus-filled part of the aorta, which does not take up contrast medium and therefore cannot be segmented by simply thresholding Alternatively a three-dimensional active surface with appropriately-chosen internal forces readily segments the thrombus-filled region.

The desired outcome, when the forces arrive at the equilibrium, is a surface e.g. FIG. 1 that is congruent with nearby image features and satisfies some requirements about the surface properties (eg. elasticity). Thus, such a model can seamlessly integrate characteristics of the surface with evidence in the image where available.

Deformable contours and surfaces are described in the aforementioned text on active contours in respect of applications applied in such diverse areas as actor-driven facial animation, traffic monitoring, crop spraying, biometrics, audio-visual speech analysis, user interface, as well as medical image analysis. Particular application of the active surface methods to vessel location will now be discussed.

2 Active Surface Method of Extraction of Vessel Walls 2.1 Review of Theory

The process of extraction of the vessel wall can proceed by defining a parametric surface $v(s, r)=(x(s, r), y(s, r), z(s, r))$ on a parameter region $\Omega$, and minimising the 'energy' functional in a space (denoted $\Pi$) of permissible deformations of the surface. The energy functional can be defined as follows:

$$E(v) = \int_\Omega \left\{ w_{10} \left|\frac{\partial v}{\partial s}\right|^2 + w_{01} \left|\frac{\partial v}{\partial r}\right|^2 + w_{11} \left|\frac{\partial^2 v}{\partial s \partial r}\right|^2 + w_{20} \left|\frac{\partial^2 v}{\partial s^2}\right|^2 + w_{02} \left|\frac{\partial^2 v}{\partial r^2}\right|^2 + P[v(s, r)] \right\} ds\,dr \quad (1)$$

where P is the potential associated with the external force, and $w_{10}$, $w_{01}$, $w_{11}$, $w_{20}$, $w_{02}$ control surface properties of tension, rigidity and resistance to twist (they do not necessarily have to be constants). P can be defined as $-\|\nabla I_{(v)}\|$, where I is the image.

A minimum of E can be obtained by solving the associated Euler-Langrange equation with boundary conditions. For a discussion of the minimisation of E reference is made to McInerney, T. and Terzopoulos, D., "Deformable models in medical image analysis: A surveys". Medical Image Analysis, Vol. 1, No. 2, pp. 91–108, 1996 and Cohen, I., Cohen, L. D. and Ayache, Y, "Using deformable surfaces to segment 3D images and infer differential structures", CVGIP: Image Understanding, Vol. 56, No. 2, pp. 242–263, 1992.

Let $$\Delta f = -\frac{\partial}{\partial s}\left(w_{10} \frac{\partial v}{\partial s}\right) - \frac{\partial}{\partial r}\left(w_{01} \frac{\partial v}{\partial r}\right) + 2\frac{\partial^2}{\partial s \partial r}\left(w_{11} \frac{\partial^2 v}{\partial s \partial r}\right) + \frac{\partial^2}{\partial s^2}\left(w_{20} \frac{\partial^2 v}{\partial s^2}\right) + \frac{\partial^2}{\partial r^2}\left(w_{02} \frac{\partial^2 v}{\partial r^2}\right) + \nabla P(v)$$

then the Euler-Langrange equation is $\Delta f = 0$.

If the terms of $\Delta f$ are viewed as internal and external forces, then a minimum of E occurs when these forces achieve equilibrium.

In many practical applications, a solution to the above static problem of minimisation is obtained by constructing a corresponding dynamic system. To construct a dynamic, evolving system, the principles of Lagrangian mechanics are applied and a time-varying surface is introduced. The evolution of the surface is governed by:

$$\frac{\partial v}{\partial t} + \Delta f = 0 \quad (2)$$

with initial and boundary conditions. A numerical solution is then obtained by iteratively solving and updating a group of linear equations after Equation (2) is discretized in both time and space using the finite differences method (or the finite element method).

The linear system can be written as $$Ax = b \quad (3)$$

where the elements of the vector x are the coordinates of the control points of the surface vertices.

(a) The Issue of Local Minima and an Additional External Force

As is the case for many other optimisation problems, the energy function E(v) above is not convex, raising the issue of local minima. Equation (2) shows that the dynamic system will converge on finding the first local minimum on the evolutionary path.

For instance, if the initial surface is sufficiently removed from the wall of the vessel and the external forces are weak, a minimum occurs when the surface collapses to become a point. To counter the tendency of shrinking under the internal forces, another external force $$F_B = \alpha \vec{N}(v)$$

is desirably added to the image force $-\nabla P(v)$ to 'inflate' the surface, where $\alpha$ is a coefficient and N(v) is a unit surface normal vector.

2.2 Processing (a) Surface Mesh

Figure 6:
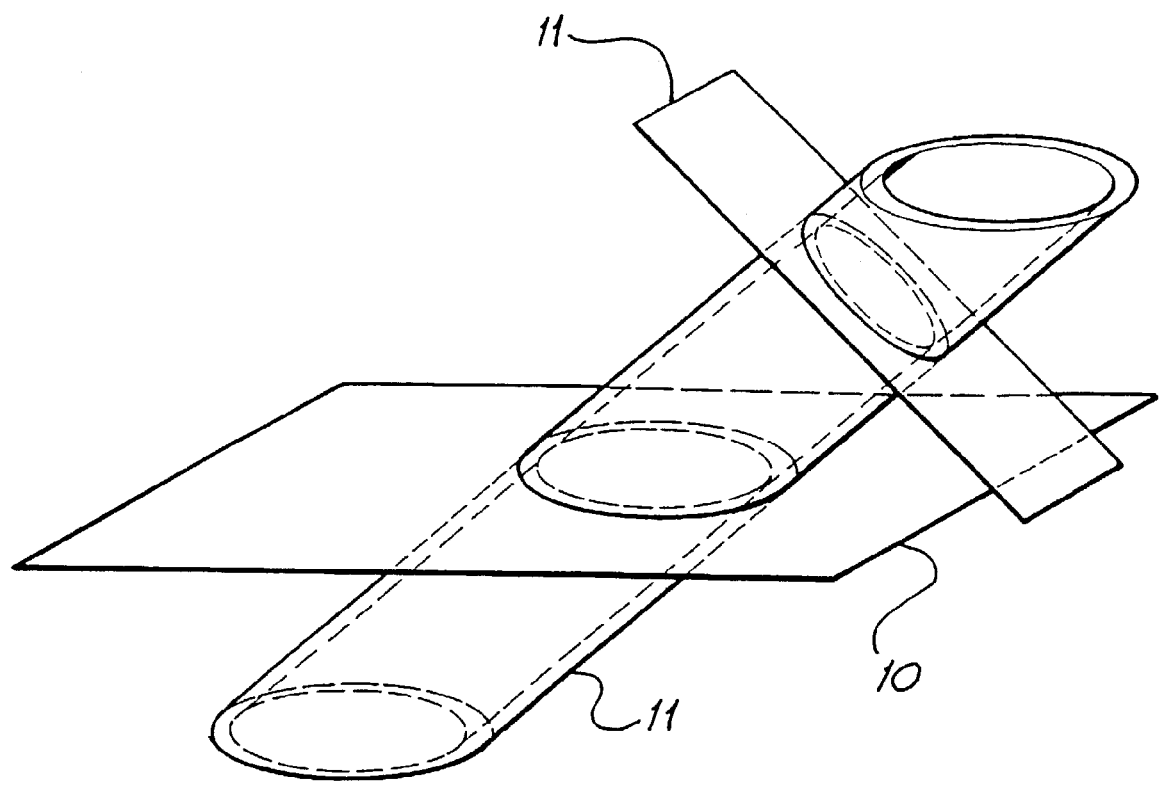

Due to the simplicity in the structure of the target surface, it is possible to utilise what can be referred to as the constrained 3D model. The model is constrained in that each mesh point is only allowed to move within a plane. The planes are not necessarily the same as the data slices. For example, as illustrated in FIG. 6, a scan 10 will provide a sectional view of a vessel 11 and where the vessel is at on an oblique angle, the section through the scan will also be oblique. In the constrained model, the plane 11 is that formed by a section 11 through the vessel structure. Nevertheless, tensions between points on different planes can be incorporated in the dynamic system to ensure regularity along the orientation of the vessel.

(b) Initial Surface

The start position for the active surface can be the medial axis inside the flow channel (which will be referred to as the medial axis of the channel), obtained from a previous processing stage of skeletonisation of the images. The complex structures outside and adjacent to the vessels give rise to many local maxima (or minima of P in Eq. (1)), resulting in great difficulties in directing the active surface towards the vessel. Thus, a 'ballooning' algorithm is chosen where an active surface expands from inside a vessel until it finds the wall of the vessel.

In a further refinement, active surface parameters can be adjusted on the basis of incoming data so that the intrinsic constraints undergo a low degree of variation with the source of the data or processing artefacts such as the number of control points. This also helps to achieve isotropic smoothness in the spatial domain.

In a modified embodiment, the part of the flow channel inside an aneurism can be recovered by a different active surface from the one used outside of the aneurism. Cross sections of the inside flow channel tend to have sharp corners, less regular shapes and larger sizes and hence require different active surface techniques, However, in the modified embodiment, the separately recovered parts may fail to give a uniform and continuous appearance.

2.3 Thresholding

As previously discussed, it is necessary to ensure that the evolving active surface does not meet an energy local minimum inside the vessel. A first obstacle to achieving this condition arises from the fact that the resultant surface must enclose two components of quite different intensity values. Referring again to FIG. 1, the image forces resulting from grey level discontinuity along the boundary 7 between the flow channel 2 and the thrombus 3 can give rise to an undesirable local minimum. Another obstacle is that fluctuations in the CT data inside a vessel may also produce enough image force to give rise to a premature convergence of the active surface.

Both of the above obstacles can result in the active surface lodging on something other than the entire wall of the aorta. In addition, since the flow channel 2 and the thrombus 3 have very different grey levels, the image forces around the corresponding parts of the wall will also be different. A measure that normalises the image force may help remove this last problem.

To overcome the above obstacles, thresholding may be utilised. Related processing includes:

(a) Adaptive Thresholding

In adaptive thresholding, the threshold for extracting the outer surface is adaptively set to be the maximum value that allows a minimum of 90% of a selection of test voxels to pass. The test voxels are the non-flow-channel voxels on the "YES" cross sections (see below) enclosed by an active surface evolving on the binary data obtained using an initial estimated threshold.

(b) Estimation of Underlying Structure

The outer surface processing, based on the above thresholding procedure, is done on the entire vessel. Due to the lower threshold and less tension used, this procedure is less resistant to interference from vessel branching and other outside organs. This is especially true where the vessel is much thinner than expected (ie where there is in fact no thrombus). The system can discard those parts likely to be inaccurate by determining the true axial extent of the thrombus.

In order to accomplish the above task more accurately, in a further modification, a technique akin to hysteresis thresholding in edge linking can be used. As there is no a priori knowledge regarding the presence or absence of an aneurism on any given part of the aorta, the beginning and end positions of the thrombus can be estimated based on the shape and size of the recovered flow channel. The basis is the empirical observation that where the thrombus resides the otherwise almost perfectly circular cylinder-like flow channel deforms markedly (the average radii of the cross sections also tend to increase). A set of three aspects: radius, area to circumference ratio (related to both size and shape) and difference from inner surface) are tested. If a cross section passes all three higher threshold, it is labelled "YES". Otherwise, if it passes any of the three lower threshold, it is labelled "MAYBE". The rest are labelled "NO". The "MAYBE" and "YES" cross sections are as units assembled into segments. Any segment that has at least one "YES" unit and is longer than 5 is admitted.

(c) Gradients

Consistent with the constrained 3D model, gradients are calculated within the planes 11 of FIG. 6. The preferred computation combines a Gaussian smoothing operation with the calculation of partial derivatives in a similar manner to that discussed in the aforementioned article by McInerney, T. and Terzopoulos, D.

Gradients due to nearby organs can distract the active surface when part of it evolves into the vicinity of the responsible edge voxels. To remove any possible interference from them, directions of gradients are incorporated.

2.4 Active Surface Undesirable Local Minima and Modified Measures to Bypass them In the beginning, a small tube is formed around the medial axis of the flow channel, and is allowed to evolve. As shown in FIG. 1, in a cross section where a thrombus is present, the flow channel 2 can be highly eccentric relative to the centre of the vessel. Furthermore, the eccentricity varies considerably from slice to slice and is unknown al priori. A related problem is that, due to some limitations in the medial axis segmentation, at some places the start position of the curve may be situated quite close to the surface of the flow channel.

Since the image force is a rather local one, either of the above problems can result in an undesirable situation: when the surface reaches a point in the space of permissible deformations, $\Pi$, where part of it has found the gradient magnitude maxima on the near side and the total energy has been reduced, the other part of the surface is still too far away from the gradient discontinuities on the far side to be influenced by them. Therefore, nearby deformations (here the proximity is that in space $\Pi$) of the surface do not lead to any more energy reduction. In other words, the energy functional has reached a local minimum prematurely while the evolving model is still inside the target surface.

Reducing the strength of internal forces would help in the above situation, as this would lead to reduced energy increase due to internal tension caused by further deformation. However, since the target surface can be under-determined, constraints need to be strong. Therefore, this is not a highly suitable alternative.

Three measures have been taken to avoid premature convergence. Firstly, accepting that, because of an imperfect initial condition, the first resultant surface may not be totally congruent with the target edge elements (edgels) in the image at convergence, it may be possible to improve the initial conditions iteratively. That is, it is assumed that with each run a larger part of the target surface is accurately recovered and thus a new initial surface can be formed for the next run on the basis of the more correct, new information. Secondly, to better determine the initial conditions for thrombus recovery, instead of directly using the medial axis of the flow channel, it is possible to take advantage of the fact that the flow channel is often on one side of the vessel. Thirdly, it is possible to increase the available range of the image force by using larger smoothing scales in calculating gradients in the initial pass and decrease it in subsequent iterations to promote better localisation of the final result.

2.5 Extrapolation

As part of the outer surface may not be from the same active surface process (see above), smooth transition may become an issue. An extrapolation procedure can therefore be used. At the beginning and the end of the thrombus, the outer surface is linearly extrapolated to the next immediate cross section. This process is continued until successive contours differ by no more than about 4 mm. A cubic reduction factor can be applied to accelerate the convergence and counter any tendency of divergence due to arbitrary factors.

2.6 Surface Adjustment

Occasionally, due to the random ingredient in the nature of the algorithms as well as possibly a side effect of using the directions of gradients (which has more effect on the outer surface than the inner one due to the different thresholds used), parts of the flow-channel surface may in fact be even slightly outside the outer surface. This can be overcome by checking the relative relation to a central position of corresponding points. The points on one contour can be interpolated against the other so the corresponding points are aligned angularly.

2.7 Incorporating Human Input in the Analysis

On some occasions, the automated system may fail to successfully segment the desired vessel structures. For example, where the flow channel has extremely high curvature points, some form of intervention or direction by the user may be desired to ensure the accuracy of the fitted surface.

One scenario of the user providing guidance to the essentially automatic process may be that the user selectively marks a few points that the resultant surface must go through. In such a scenario, there are at least two alternative methods to ensure that the automatic system takes up the guidance.

2.7.1 Method 1,

This is a natural and straightforward method. It mutates the control point vector x as well as the matrix A and the vector b in Eq. 3 prior to solving the linear equation group Ax=b. That is, one can select $\{xi_k, k=1, 2, \ldots, m, i_k \in [1, N]\}$ to correspond to the marked points, where N is the total number of control points, m the number of the marked points. The effects of these points upon other points through the matrix elements $\{Ai, i_k\}$, where $k=1, 2, \ldots, m$ and $i \neq i_k$, then become a priori knowledge and can thus be shifted to the right hand side (thus mutating vector b). Then, the selected points, along with $\{Ai_{k,j}, k=1, 2, \ldots, m, i_k \in [1,N], j=1, 2, \ldots, N\}$, $\{Ai, i_k, i=1, 2, \ldots, N, k=1, 2, \ldots, m, i_k \in [1, N]\}$ and $\{bi_k, k=1, 2, \ldots, m\}$ are taken out of the equation.

Repeatedly marking guiding points using the above method, however, requires careful maintenance of a look-up table that registers correspondence between the points in the equation and the control points. It also requires consistency to be constantly maintained between the two groups of points, using the registry in the process. Moreover, modification of the matrix A is also dependent on the registry, which can serve as a substitute for the history of mutations.

2.7.2 Method 2,

An alternative method that avoids the above disadvantages is to keep the two groups of points identical in the mutation process. After the effects of the marked points upon other points are shifted to the right hand side of the equation, A is modified such that $$\left\{Ai_k, j = \begin{cases} bi_k/xi_k & \text{if } j = i_k \\ 0 & \text{otherwise} \end{cases}, k = 1, \right. \quad (a)$$

$$\left. 2, \ldots, m, i_k \in [1, N], j = 1, 2, \ldots, N\right\} \text{ and}$$

$$\left\{Ai, i_k = \begin{cases} bi_k/xi_k & \text{if } i = i_k \\ 0 & \text{otherwise} \end{cases}, \right. \quad (b)$$

$$\left. i = 1, 2, \ldots, N, k = 1, 2, \ldots, m, i_k \in [1, N],\right\}$$

This method was found to give suitable results. In practice, it is not necessary to constantly calculate $bi_k/xi_k$ as a result of the iteration. On the other hand, if $bi_k/xi_k$ is calculated, this method can be further simplified so that neither (b) nor the mutation of (b) needs to be carried out.

2.7.3 User-Guided Segmentation

It is also possible to proceed directly to full segmentation of the vessel structure without prior computation of their centre-line locations. In such a scenario the user needs to provide very limited initial guidance. Examples of such guidance may be positional information of two points (preferably well apart in the axial direction) which are inside each vessel belonging to the structure, or at lest two manually traced perpendicular outlines for each vessel. Both can be easily done, for instance, with a simple graphical user interface.

The system then interpolates between, and/or extrapolates from, the manual input to provide the initialisation needed. The segmentation then proceeds in the same manner as that described for the fully automatic system. In the event where the user has traced vessel outlines, it is possible to ensure that those outlines are incorporated without change in the final outcome using the methods described above.

3 Visualisation

Visualisation of the result can be done by generating standard Virtual Reality Modelling Language (VRML) models or Java 3D models, both of which can be displayed and manipulated on most desktop computers. The aforementioned methods have been utilised to segment and display the aorta, thrombus, renal and iliac arteries and superior mesenteric artery in contrast-enhanced 3D CT scans of a small number of pre- and post-treatment patients.

The resulting model is more than a visualisation, since each component in the visualisation (several distinct vessel surfaces, medial axes, thrombus, etc) can be identified with the original anatomical model. There is considerable scope for incorporating parameters such as mechanical properties to permit, for example, full rehearsal of surgical procedures. In initial implementations, easy-to-use measurement tools (for example a tool to estimate diameter and length of stent graft) may be developed. This system will allow the surgeon access to a computer model immediately after the patient has undergone the pre-treatment CT scan.

The reconstruction is normally straightforward except at the bifurcation point of the aorta, which can be overcome using schemes such as a Delannay triangulation algorithms, vertex merging and vertex grouping. The outcome can also include measurements of the aorta, such as shappe distortions and the radii of the vessel at a range of locations.

Figure 8:
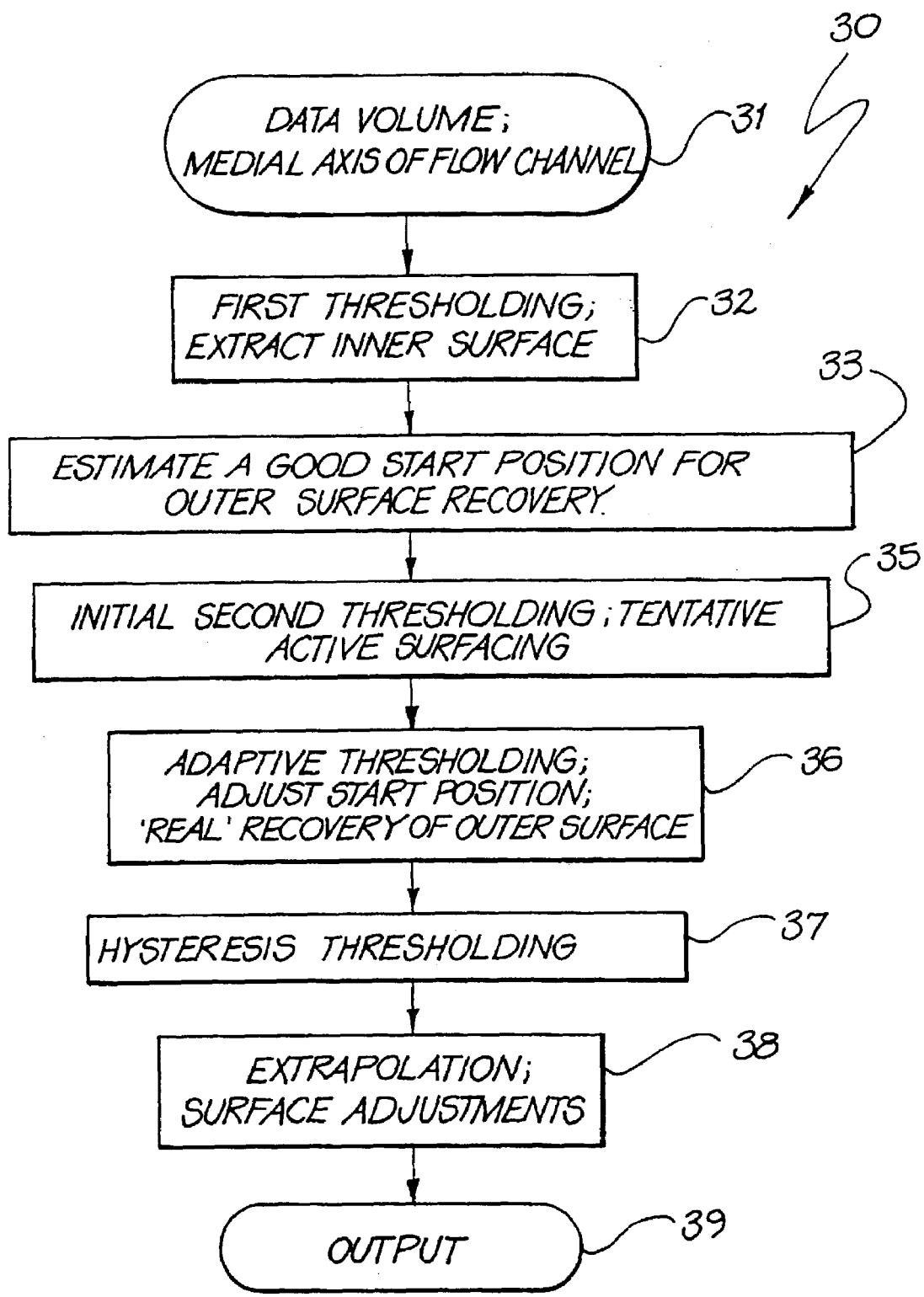
FIG. 8 illustrates a flow chart of the steps involved in the process of extraction of the aorta structure of the preferred embodiment.

In FIG. 8 there is illustrated an example flow chart 30 of the steps involved in one embodiment in the extraction of a blood vessel such as the aorta from a series of CT scans. Initially, the data volume was processed 31 utilising skeletonisation techniques so as to determine a medial axis of the aorta flow channel. A first thresholding 32 was done so as to extract the inner surface of the flow channel. This was then utilised as a good start estimate for an outer surface recovery 33. A second initial thresholding then takes place and tentative active surfacing to provide an initial outer surface estimate 35. The adaptive thresholding process was then utilised 36 to recover the outer surface. This was followed by a hysteresis thresholding 37 and any required extrapolation or surface adjustments 38 before final output 39 in a VRML format.

It would be appreciated by a person skilled in the art that numerous variations and/or modifications may be made to the present invention as shown in the specific embodiments without departing from the spirit or scope of the invention as broadly described. The present embodiments are therefore, to be considered in all respects to be illustrative and not restrictive.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications obvious to those skilled in the art can be made thereto, without departing from the scope of the present invention.

The invention claimed is:

1. A method of extracting computer graphical objects including at least one vessel structure from a data volume of a portion of an anatomy, the method comprising the steps of:
   utilising a three-dimensional medical image segmentation process to segment a three-dimensional medical image to determine an approximate axial location of said vessel structure;
   utilising an active surface technique to extract a computer model of the outer surface of said vessel structure based on said approximate axial position as a seed for the active surface technique;
   and digitally storing three-dimensional co-ordinate information of the computer model of said outer surface for subsequent display.

2. A method as claimed in claim 1 wherein said image segmentation process further includes the step of processing said data volume to produce an intermediate data structure and utilising an inferencing system on said intermediate data structure to determine the most suitable candidate for said at least one vessel structure.

3. A method as claimed in claim 1 wherein the inferencing process system is arranged in manner such that the most suitable candidate is identified based on model object frames, the model object frames each including a set of data entries specifying information about a model object.

4. A method as claimed in claim 1 wherein the information includes unary properties of the model object and/or relationship properties of the model object.

5. A method as claimed in claim 4, wherein the relationship properties include one or more of the group of membership property of a semantic network, and relative location data with respect to other model objects.

6. A method as claimed in claim 1, wherein the inferencing system is arranged in a manner such that is bases its determination on the law of fuzzy logic.

7. A method as claimed in claim 1, wherein the step of determining the outer surface of said vessel includes utilising manually designated points through which the resultant surface must go in the active surface technique.

8. A method as claimed in claim 1 wherein the active surface technique is based on data provided by a user from an initial analysis of the date volume.

9. A method as claimed in claim 8 wherein the data provided includes one or more of the group of at least two points located inside said at least one vessel structure, and at least two manually traced perpendicular vessel outlines.

10. A method as claimed in claim 1, wherein said at least one vessel structure includes a thrombus.

11. A method as claimed in claim 1, wherein said at least one vessel structure comprises one of a blood vessel, an airway, and other passageways of a human's anatomy.

12. A method as claimed in claim 11 wherein said at least one vessel structure comprises one of the aorta, the superior mesenteric artery, a renal artery or an iliac artery.

13. A method as claimed in claim 1, wherein said data volume comprises a series of two-dimensional computer tomography scanned images of a human's anatomy.

14. A method as claimed in claim 1, wherein said segmentation process utilises a series of sampled images at different sampling resolutions for identification of different vessel structures.

15. A method as claimed in claim 1, wherein said segmentation process includes applying a 3-dimensional line enhancement filter to said data volume.

16. A method as claimed in claim 1, wherein said segmentation process includes skeltonisation of a line enhanced filtering of an initial data volume.

17. A method as claimed in claim 1, wherein said active surface technique includes an adaptive thresholding processes.

18. An apparatus for extracting computer graphical objects including at least one vessel structure from a data volume of a portion of an anatomy, the apparatus comprising:
   three-dimensional medical image segmentation processing means for applying a three-dimensional medical image segmentation process to determine an approximate axial location of said vessel structure;
   active surface processing means for applying an active surface technique to extract a computer model of the outer surface of said vessel structure based on said approximate axial position as a seed for the active surface technique;
   and a database for digitally storing co-ordinate information of the computer model of said outer surface for subsequent display.

* * * * *